US008103622B1

(12) United States Patent
Karinta (10) Patent No.: US 8,103,622 B1
(45) Date of Patent: *Jan. 24, 2012

(54) RATE OF CHANGE MONITORING FOR A VOLUME STORING APPLICATION DATA IN A FRACTIONALLY RESERVED DATA STORAGE SYSTEM

(75) Inventor: Vineeth Karinta, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/687,459

(22) Filed: Jan. 14, 2010

Related U.S. Application Data

(63) Continuation of application No. 11/644,633, filed on Dec. 22, 2006, now Pat. No. 7,676,510.

(51) Int. Cl.
  *G06F 17/30* (2006.01)
(52) U.S. Cl. ........................................ 707/609
(58) Field of Classification Search .......... 707/201–203, 707/205; 711/162
  See application file for complete search history.

(56) References Cited

U.S. PATENT DOCUMENTS

| | | | |
|---|---|---|---|
| 5,278,979 A * | 1/1994 | Foster et al. ........................... | 1/1 |
| 5,566,331 A | 10/1996 | Irwin, Jr. et al. | |
| 5,649,152 A | 7/1997 | Ohran et al. | |
| 5,819,292 A | 10/1998 | Hitz et al. | |
| 5,963,962 A | 10/1999 | Hitz et al. | |
| 6,092,066 A | 7/2000 | Ofek | |
| 6,131,148 A | 10/2000 | West et al. | |
| 6,182,198 B1 | 1/2001 | Hubis et al. | |
| 6,289,356 B1 | 9/2001 | Hitz et al. | |
| 6,311,193 B1 | 10/2001 | Sekido | |
| 6,330,570 B1 | 12/2001 | Crighton | |
| 6,341,341 B1 | 1/2002 | Grummon et al. | |
| 6,584,551 B1 | 6/2003 | Huber | |
| 6,665,815 B1 * | 12/2003 | Goldstein et al. ............... | 714/20 |
| 6,745,207 B2 | 6/2004 | Reuter et al. | |
| 6,857,059 B2 | 2/2005 | Karpoff et al. | |
| 7,159,072 B2 * | 1/2007 | Kitamura ....................... | 711/112 |
| 7,577,692 B1 * | 8/2009 | Corbett et al. .......................... | 1/1 |
| 7,660,832 B2 * | 2/2010 | Nomoto et al. ............... | 707/649 |
| 7,676,510 B1 * | 3/2010 | Karinta ........................ | 707/654 |
| 2002/0161983 A1 | 10/2002 | Milos et al. | |
| 2003/0084241 A1 | 5/2003 | Lubbers et al. | |
| 2003/0101321 A1 | 5/2003 | Ohran | |
| 2003/0167380 A1 | 9/2003 | Green et al. | |
| 2003/0187887 A1 * | 10/2003 | Beal .............................. | 707/204 |
| 2004/0250033 A1 | 12/2004 | Prahlad et al. | |
| 2005/0086432 A1 | 4/2005 | Sakai | |
| 2005/0172092 A1 | 8/2005 | Lam et al. | |
| 2006/0085608 A1 | 4/2006 | Saika | |
| 2007/0101063 A1 * | 5/2007 | Nomoto et al. ............... | 711/118 |

\* cited by examiner

*Primary Examiner* — Sheree Brown
(74) *Attorney, Agent, or Firm* — Blakely, Sokoloff, Taylor & Zafman LLP (57) ABSTRACT

A mechanism by which a server system executing a host application monitors utilization of a fractionally reserved space on a volume storing application data. The server system executes space reservation policies to ensure that the host application is not halted due to inability to create snapshots on the volume. In one implementation, the server system alerts a system administrator if the rate of change in the size of data snapshots exceeds a specified threshold and initiates deletion of backup datasets stored on the volume if the size of a data snapshot exceeds the available space on the volume.

14 Claims, 7 Drawing Sheets

RATE OF CHANGE MONITORING FOR A VOLUME STORING APPLICATION DATA IN A FRACTIONALLY RESERVED DATA STORAGE SYSTEM

RELATED APPLICATIONS

This application is a continuation of co-pending U.S. patent application Ser. No. 11/644,633, filed Dec. 22, 2006.

FIELD OF THE INVENTION

Embodiments of the invention relate to data storage systems and, in particular, to monitoring space in a fractionally reserved system.

BACKGROUND

A storage system is a processing system adapted to store and retrieve data on behalf of one or more client processing systems ("clients") in response to external input/output (I/O) requests received from clients. A storage system can provide clients with a file-level access to data stored in a set of mass storage devices, such as magnetic or optical storage disks or tapes. Alternatively, a storage system can provide clients with a block-level access to stored data, rather than file-level access or with both file-level access and block-level access.

Data storage space has one or more storage "volumes" consisting of physical storage disks, defining an overall logical arrangement of storage space. The disks within a volume are typically organized as one or more groups of Redundant Arrays of Independent (or Inexpensive) Disks (RAID). A volume may contain one or more file systems. A file system is an application layer that imposes a structure (e.g., hierarchical structure) on files, directories and/or other data containers stored and/or managed by a storage system. Application data sent to a storage system from a client system for storage may be divided up into fixed-size physical data blocks (for example, data blocks A, B, and C) stored on disks within a volume. To facilitate access to the data blocks, the storage system implements a file system that logically organizes information as a hierarchical structure of named directories and files on the disks. Some known file systems, including Write Anywhere File Layout (WAFL™) file system, provided by Network Appliance, Inc., of Sunnyvale, Calif., provide capability for creating snapshots of an active file system. An "active file system" is a file system to which data can be both written and read. The snapshot is a persistent point in time (PPT) image of the active file system that enables quick recovery of data after data has been corrupted, lost or altered. The PPT image and a "snapshot" shall be used interchangeably throughout this description. Snapshots can be created by copying the data at each predetermined point in time to form a consistent image, or virtually, by using a pointer to form the image of the data.

When pointers are used for snapshot creation, the created snapshot points to the data blocks in the active file system, such as data blocks A, B, and C. If one data block, e.g., data block C, is modified, a new data block (for example, data block C') is allocated for new data and the new data block is written at a new location on a disk. Now the file system points to the new data block C' as well as to the data blocks A and B. The file system terminates the link to the old data block C. Although data block C was modified, it is now being locked by the snapshot and cannot be de-allocated for new data until the snapshot is deleted. Thus, when blocks in the active file system are modified or removed, new blocks are added into the active file system. The old blocks, although removed from the active file system, are still being held by some snapshots and physically maintained on disk within the volume. This consumes space on the volume and causes the snapshot area to grow.

Each snapshot captures and saves data that has been changed in the active file system since the last snapshot. Thus, the size of a snapshot (e.g., in megabytes) depends on the rate of data changes in the active file system. The amount of data that has been changed in the active file system relative to a previous snapshot is known as the snap-delta function ("snap-delta") because the increase (or decrease) in the next snapshot depends on the current state of changes in the active file system. Alternatively, the snap-delta may be defined as the difference in size between two snapshots.

Typically, a volume may include one or more logical unit numbers (LUN) to store user data, an initial snapshot reserve for saving one or more snapshots of the LUN, an available reserve space, and a snapshot overwrite reserve. Typically, the overwrite reserve is set to 100% of the total LUN size for snapshot overwrites. The remaining unused volume space (available volume space) is then available for snapshot data (and/or other data and files such as system files). A portion of the volume space equal to the size of the LUN is initially reserved for snapshot data to guarantee that at least one snapshot can be taken (e.g., if every data block in the LUN is changed).

When a first snapshot is created, the initial snapshot reserve is used. As additional snapshots are created, the available reserve space is used until all of the available reserve space is consumed by the snapshots so that only the snapshot overwrite reserve is available for subsequent snapshots. Because the overwrite reserve is allocated at 100% of the LUN size, there is still space on the volume if all data blocks are modified and a snapshot is created. A noted problem with this technique is that by maintaining overwrite reserve equal to the amount of space allocated for the application data, the amount of available space on the volume that can potentially be consumed by snapshots and other data is decreased.

To address this problem, only a fraction of the space allocated for the application data in the volume is reserved for snapshot overwrites. Fractional space reservation leaves more space on the volume for snapshot consumption and other data. A disadvantage of fractional space reservation is that configuring less than 100% of the application data space (LUN) for snapshot overwrite reserve space creates the possibility that at some point application data cannot be modified because there is not enough space on the volume for modifying the data. Thus, using fractional space reservation requires continuous monitoring of the available space on a volume.

According to one known technique, a component of a storage system monitors available space on a fractionally-reserved volume. A write operation from a client system executing a host application is rejected if there is not enough space on the volume to complete the operation. This technique is described in a commonly-assigned U.S. patent application Ser. No. 10/991,225, entitled "System And Method For Flexible Space Reservations In A File System Supporting Persistent Consistency Point Images," by Himanshu Aggarwal and Eric Hamilton. Thus, according to this technique, the client system continues to issue I/O requests to the storage system even when there is not available space on the volume. These requests are rejected by the storage system. Rejecting client I/O requests may lead to undesirable consequences, such as loss of data. In addition, the client system halts execution of an application, which may result in performing additional steps by an application administrator, such as recovering application data and restoring the application.

What is needed is a mechanism that allows a client executing a host application to monitor the use of snapshot reserve space on a volume that stores application data and to detect conditions in the snapshot reserve space that indicate a risk of snapshot write failures before there is too little space on the volume to execute I/O requests.

SUMMARY

Embodiments of the present invention provide a mechanism by which a server system executing a host application monitors utilization of a reserve space on a volume storing application data. The server system executes space reservation policies to ensure that the host application is not halted due to available space limitations on the volume for data snapshots. In one implementation, the server system alerts a system administrator if snap-delta function exceeds a specified threshold (where the snap-delta may be defined with respect to the active file system and a recent snapshot, or with respect to two recent snapshots) and initiates deletion of backup datasets stored on the volume if the size of a data snapshot exceeds the available space on the volume.

According to an embodiment of the present invention, the server system executes a monitoring engine configured to obtain information about utilized snapshot reserve space from a reporting engine at the storage system. The monitoring engine executes a space reservation (SR) policy engine configured to receive, from a system administrator, various criteria (such as thresholds) for executing SR policies. The SR policy engine compares the rate of data change in the active file system to the size of a recent snapshot, which provides a measure of the size of the next snapshot and the rate at which volume space is being consumed by snapshots. If the rate of data changes is greater than or equal to a specified threshold, the SR policy engine provides an alert to the system administrator.

Other aspects of the invention will become apparent from the following detailed description taken in conjunction with the accompanying drawings, which illustrate the principles of the invention by way of example.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Embodiments of the present invention provide a mechanism for client monitoring of a rate of data changes in an active file system relative to a recent snapshot on the volume (a "snap-delta" function as defined herein) in a volume having a fractional overwrite reserve, for specifying a snap-delta threshold, for comparing the snap-delta function to the snap-delta threshold, and for implementing space reservation policies on the volume when the snap-delta threshold is exceeded, to avoid the suspension of a host application on a server system. In one implementation, the server system initiates deletion of backup datasets stored on the volume if certain criteria provided by a system administrator are met. A backup dataset may include one or more snapshots of application data. A backup dataset may also include a log of changes to the data and metadata describing the backup dataset. Since deletion of backup datasets on the volume is initiated by the server system, which maintains knowledge about stored backup datasets, the server system may use various rules to decide which backup datasets should be deleted to recover space on the volume and which data needs to be retained.

Figure 1:
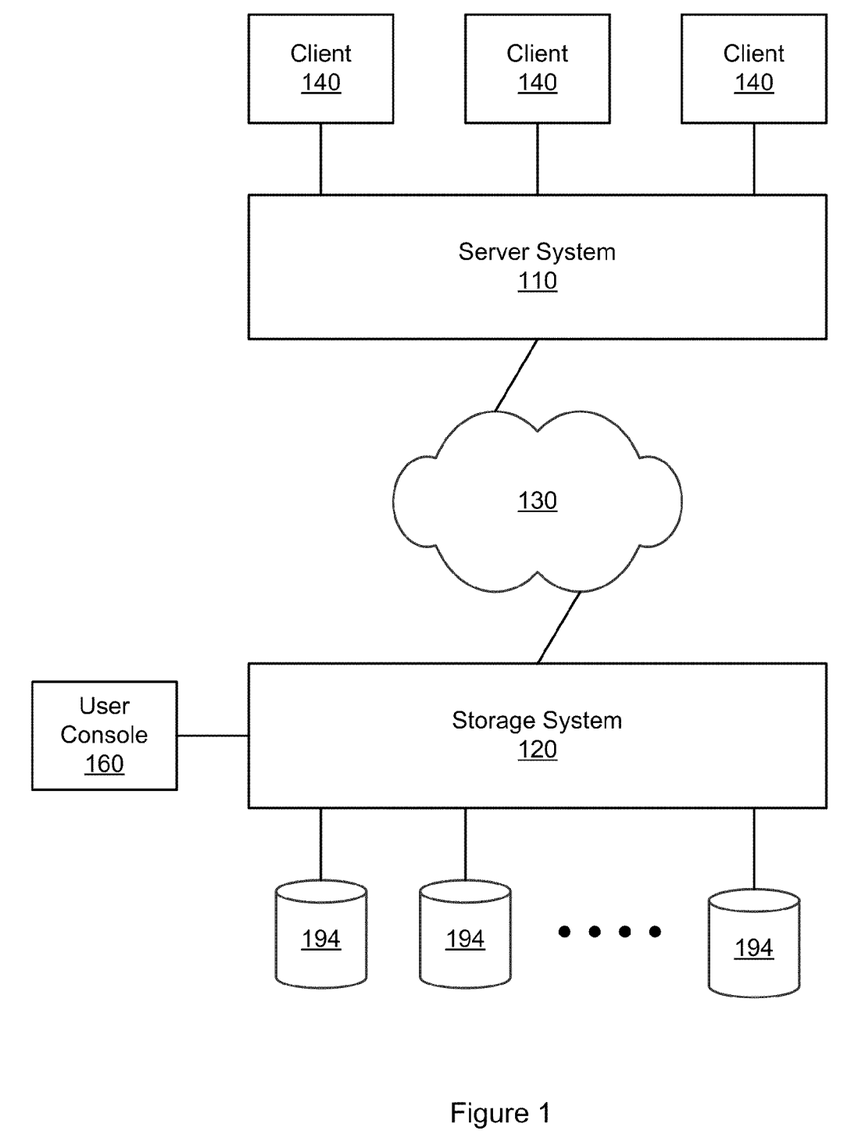
FIG. 1 is a diagram illustrating a network environment that includes a storage system and a server system capable of implementing space reservation policies according to an embodiment of the invention.

Referring now to FIG. 1, it illustrates a server system 110 that implements space reservation policies according to an embodiment of the present invention and a storage system 120. Server system 110 is connected to multiple clients 140.

Server system 110 is a computer that handles requests for data, electronic mail, file transfers and other network services from other computers, i.e., clients 140. As will be described in greater detail herein, server system 110 may execute Microsoft™ Exchange Server and Microsoft™ SQL Server, both products provided by Microsoft Corp., of Redmond, Wash. Microsoft Exchange Server is a messaging and collaboration software system that provides support for electronic mail (e-mail) to various clients (such as clients 140) connected to server system 110. Microsoft SQL Server is a relational database management system. A person of ordinary skill in the art would understand that although the present invention is described in the context of Microsoft Exchange Server and Microsoft SQL Server for illustrative purposes only, server system 110 can execute any other application. Server system 110 can be connected to clients 140 over a network, such as a Local Area Network (LAN), Wide Area Network (WAN) or the like.

Server system 110 utilizes services of storage system 120 to store and manage data, such as for example, files, in a set of mass storage devices 194, such as magnetic or optical storage based disks or tapes. As used herein, the word "file" encompasses a container, an object or any other storage entity. Interaction between server system 110 and storage system 120 can enable the provision of storage services. That is, server system 110 may request the services of the storage system 120, and the storage system 120 may return the results of the services requested by the server system 110, by exchanging packets over the connection system 130. The server system 110 may issue packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the server system 110 may issue packets including block-based access protocols, such as the Small Computer Systems Interface (SCSI) protocol encapsulated over TCP (iSCSI) and SCSI encapsulated over Fibre Channel (FCP), when accessing information in the form of blocks. Storage system 120 is coupled locally to server system 110 over connection system 130, such as a local area network (LAN), a wide area network (WAN), metropolitan are network (MAN) or the Internet.

As described herein, storage system 120 stores data preferably on one or more writable storage device media, such as magnetic disks, video tape, optical, DVD, magnetic tape, and any other similar media adapted to store information, including data and parity information. However, as illustratively described herein, the information is preferably stored on the disks 194. The disks 194 within a volume are typically organized as one or more groups of Redundant Array of Independent (or Inexpensive) Disks (RAID).

Storage system 110 can be connected to a user console 160, such as a monitor with a keyboard. A user can provision storage space on disks 194 via user console 160. To provision storage space, a user takes into consideration various factors, such as a schedule according to which data will be backed up on disk(s) 194, the retention plan (i.e., how long the data is going to be maintained), whether the data is going to be mirrored and how often the data on disk(s) is going to change. According to an embodiment of the present invention, a user configures less than 100% for overwrite reserve. As noted herein, overwrite reserve is space reserved to ensure that data blocks can be modified after the snapshot reserve space in a volume is consumed by previous snapshots. Overwrite reserve with less than 100% reservation (also referred to herein as "fractional reserve") does not guarantee that every block of data can be modified, yet it makes more space available on the volume for snapshots and other application data. The fractional reserve percentage value can be set between 0 and 99%.

Figure 2A:
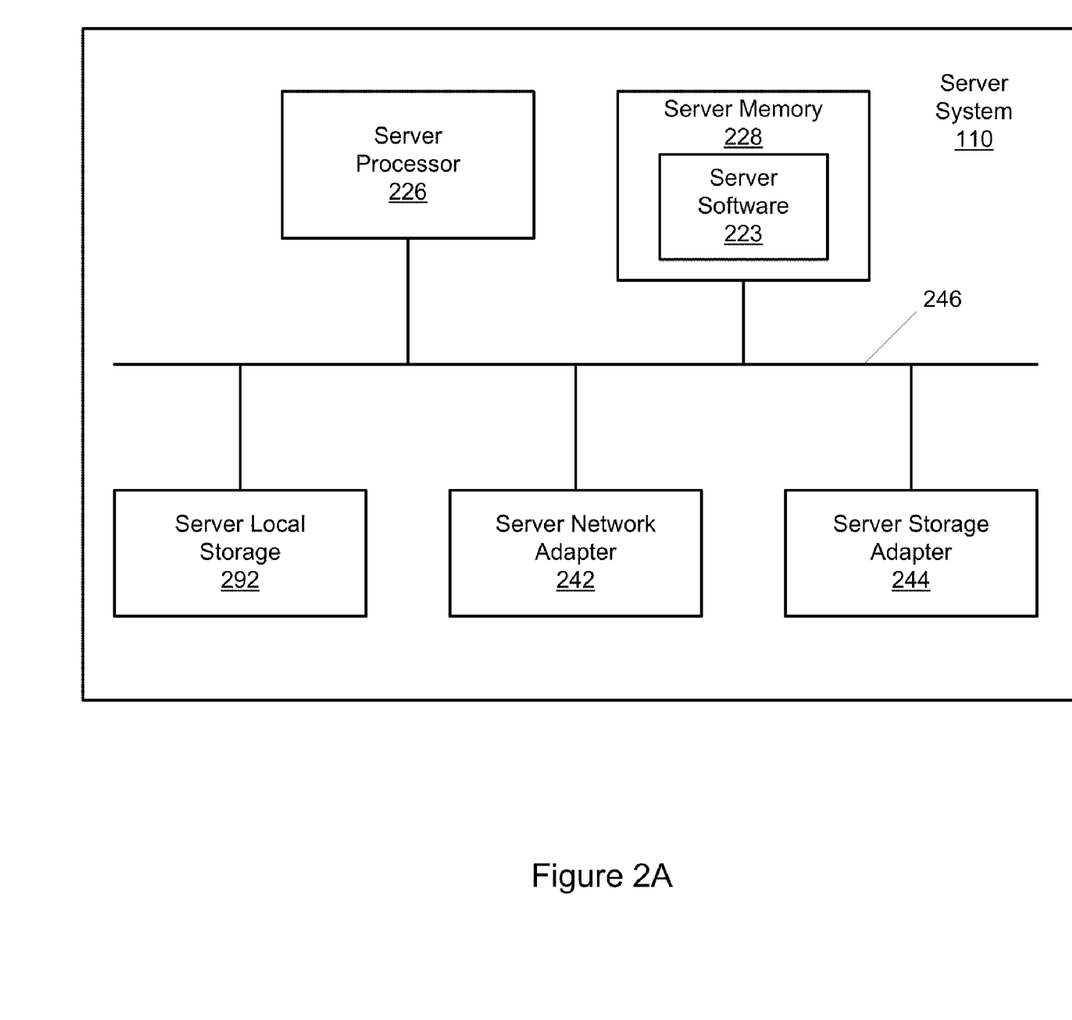
FIG. 2A is a block diagram illustrating various components of the server system shown in FIG. 1 according to an embodiment of the invention.

Referring now to FIG. 2A, server system 110 comprises server processor(s) 226, server memory 228, a server network adapter 242, a server storage adapter 244, and a local storage 292 coupled by a bus 246.

The server processors 226 are the central processing units (CPUs) of the server system 110 and, thus, control the overall operation of the server system 110. In certain embodiments, the server processors 226 accomplish this by executing software, such as that described in more detail herein. Server processors 226 may include one or more programmable general-purpose or special-purpose microprocessors, digital signal processors (DSPs), programmable controllers, application specific integrated circuits (ASICs), programmable logic devices (PLDs), or the like, or a combination of such devices.

Server memory 228 comprises storage locations that are addressable by the processor 226 and adapters (a server network adapter 242 and a server storage adapter 244) for storing software program code, such as server software 227 and data structures associated with the present invention. The server processor 226 and server adapters may, in turn, comprise processing elements and/or logic circuitry configured to execute the software code and manipulate various data structures. Server memory 228 can be a random access memory (RAM), a read-only memory (ROM), or the like, or a combination of such devices. It will be apparent to those skilled in the art that other processing and memory means, including various computer readable media, may be used for storing and executing program instructions pertaining to the invention described herein.

The server network adapter 242 comprises a plurality of ports adapted to couple the server system 110 to one or more clients 140 (shown in FIG. 1) over point-to-point links, wide area networks, virtual private networks implemented over a public network (Internet) or a shared local area network. The server network adapter 242 thus may comprise the mechanical, electrical and signaling circuitry needed to connect the node to the network.

The server storage adapter 244 cooperates with the server operating system 224 executing on the server system 110 to access data from disks 194 (shown in FIG. 1). The server storage adapter 244 comprises a plurality of ports having input/output (I/O) interface circuitry that couples to the disks 194 over an I/O interconnect arrangement, such as a conventional high-performance, fibre channel (FC) link topology.

Server local storage 292 is a device that stores information within server system 110, such as server software 223, server operating system 224 and data. Server system 110 loads server software 223 into server memory 228 from which they are accessed by server processors 226.

Figure 2B:
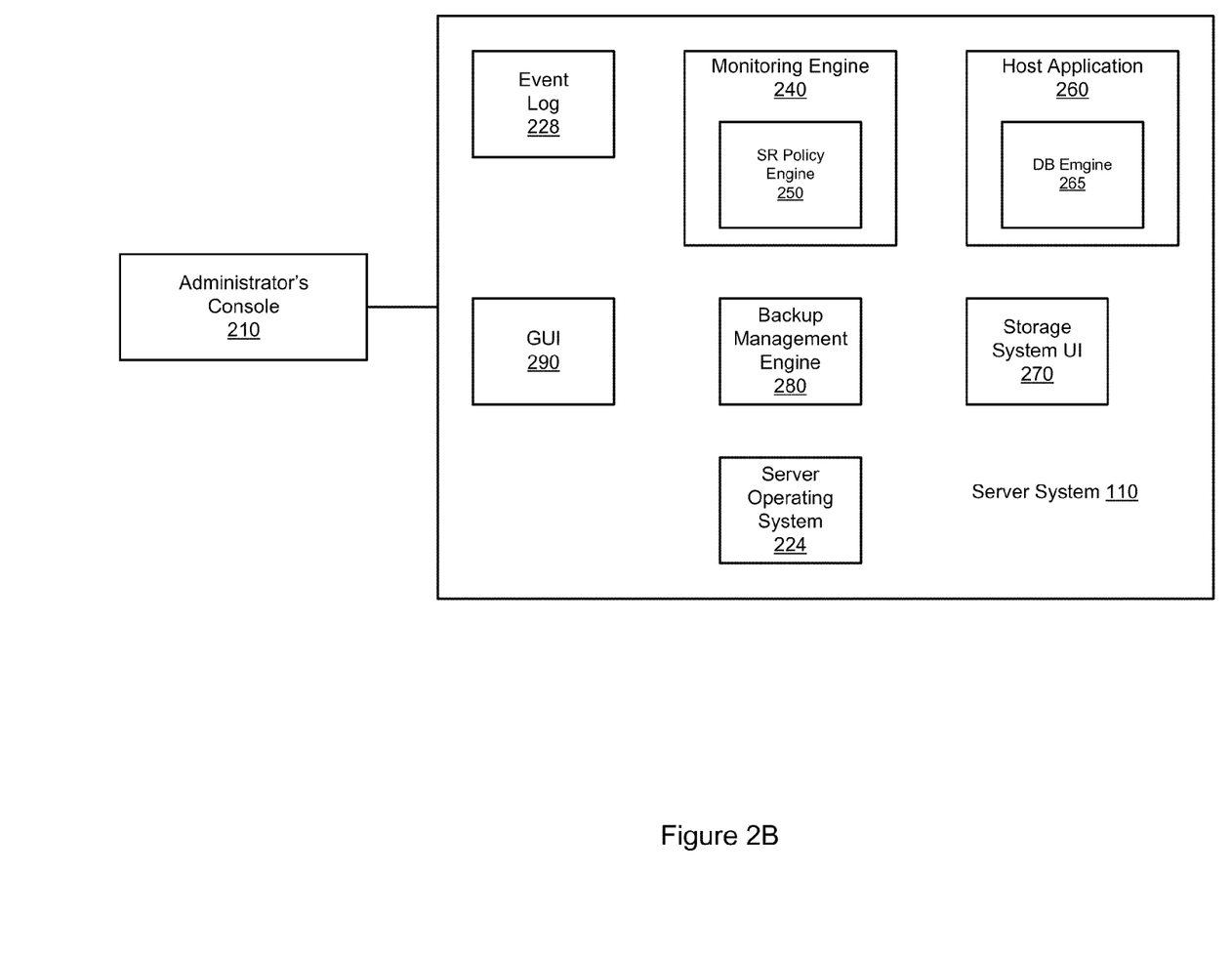
FIG. 2B is a block diagram illustrating various software components executed at the server system shown in FIG. 1 according to an embodiment of the invention.

Referring now to FIG. 2B, according to embodiments of the present invention, server system 110 executes the following software 223: a host application(s) 260, a backup management engine 280, a user interface engine 290, a storage system interface engine 270, a monitoring engine 240, a space reservation (SR) policy engine 250 and the server operating system 224. In one embodiment, these engines are implemented as modules. As used herein, the term "module" refers to computer program code adapted to provide the functionality attributed to the module upon execution by a processor. Host application(s) 260 can be, for example, Microsoft Exchange Server and Microsoft SQL Server; although the present invention contemplates that other host applications can be executed at server system 110. In the case of Microsoft Exchange Server, electronic messages are received from clients 140 by Microsoft Exchange Server and are passed to a database (DB) engine 265. DB Engine 265, in turn, may store the messages on disks 194 in the form of files. As used herein, the term "file" encompasses a container, an object or any other storage entity.

In Microsoft Exchange Server, a storage group (SG) is a unit for storing data. Each storage group may include a database file and a transaction log, which describes changes made to the database file. Backup management engine 280 causes the storage system 120 to back up storage groups using, for example, snapshot capability. The process of creating snapshots is described in U.S. patent application Ser. No. 10,090,963, entitled "System and Method for Creating a Point-in-time Restoration of Database File," by Dennis Chapman. Backup management engine 280 also causes storage system 120 to create snapinfo files that are stored on disk(s) 194. A snapinfo file may include information about a particular snapshot. This information may be, for example, a time stamp when a particular snapshot was taken and the location where the snapshot is stored on disk(s) 194. A backup dataset includes one or more snapshots of application data. A backup dataset may further include a transaction log of changes to the application data and one or more snapinfo files describing a backup dataset.

As will be described herein in reference to FIG. 3, after backup management engine 280 initiates creation of snapshots by sending a command to storage system 120 via storage system user interface engine 270, storage operating system 330 of storage system 120 (shown in FIG. 3) creates snapshots and snapinfo files. Storage operating system 330 reports back to backup management engine 280 when the operation is completed. Storage system interface engine 270 is configured to act as an interface between server system 110 and storage system 120. Engine 270 communicates with storage system 120 using, for example, Zephyr Application and Programming Interface (ZAPI) protocol. In one implementation, engine 270 is a SnapDrive® for Windows, a product provided by Network Appliance, Inc., of Sunnyvale, Calif. Server system 110 further executes the monitoring engine 240. Monitoring engine 240 is configured to periodically monitor utilization of the snapshot reserve space and the snapshot overwrite reserve space on a volume. To this end, storage system interface engine 270 sends a command(s) to reporting engine 334 at the storage system 120 (shown in FIG. 3), which monitors overwrite space utilization on the volume and provides the monitored data storage system interface engine 270. Engine 270, in turn, passes the data to the monitoring engine 240. "Periodically monitoring" as used herein means obtaining information from time to time. A person of ordinary skill in the art would understand that the utilized snapshot reserve and snapshot overwrite reserve spaces can be expressed in megabytes (MB), kilobytes (KB), gigabytes (GB) or in any other measure of computer storage, as well as by a fraction, such as a percentage (for example, if the utilized overwrite reserve space is 50%, it indicates that half of the overwrite reserve space has been used).

Monitoring engine 240 is also configured to periodically gather information about created backup datasets by reading snapinfo files. As was previously described, snapinfo files include information about snapshots, metadata files, a time stamp when a snapshot was taken, and location indicating where the snapshot is stored on disk(s) 194.

SR policy engine 250 executes space reservation policies according to embodiments of the present invention to prevent a volume(s) storing application data from running out of space. Server system 110 is connected to a system administrator's console 210 through which a system administrator can configure various settings (such as thresholds) that effect execution of space reservation policies by SR policy engine 250. GUI engine 290 provides, to a system administrator at console 210, a user interface, such as the one shown in FIG. 4 and described in more detail herein. A system administrator can modify the settings via console 210. These settings are provided to the SR policy engine 250 via GUI engine 290.

In addition, the system administrator performs migration of files to storage system 120 using backup management engine 280, GUI engine 290, monitoring engine 240, and SR policy engine 250, which are components of SnapManager™ for Microsoft® Exchange and SnapManager™ for Microsoft® SQL Server. To this end, the system administrator physically copies the files from server system 110 to storage system 120. Location of the files (such as a directory path and a volume(s) on which the files reside) is stored in server memory 228. This information is later used by SR policy engine 250 to implement space reservation policies.

SR policy engine 250 may execute a policy for automatic deletion of backup datasets when the snap-delta threshold provided by the system administrator is met. For example, the policy may specify that the most recent backup dataset of a file will not be deleted and/or that the backup dataset of a file that does not exist in the active file system will be deleted. As a result, unlike in prior art implementations, storage system 120 does not wait until the volume runs out of reserve space, due to the creation of snapshots, before notifying the system administrator and/or taking corrective action. These policies will be described in greater detail below in reference to FIGS. 4 and 5.

SR policy engine 250 can also send an event(s) to server operating system 224. Exemplary events are the snap-delta threshold is reached and deletion of backup datasets is initiated. These events are stored in an event log 228. SR policy engine 250 may send similar alerts/notifications to a system administrator at an electronic address(s) provided by the system administrator via console 210.

Server system 110 further executes the server operating system 224. Server operating system 224 is a program that is, after being initially loaded into server memory 228, manages host applications executed on server system 110. The server operating system 224 can be, for example, UNIX®, Windows NT®, Linux® or any other general-purpose operating system.

Figure 3:
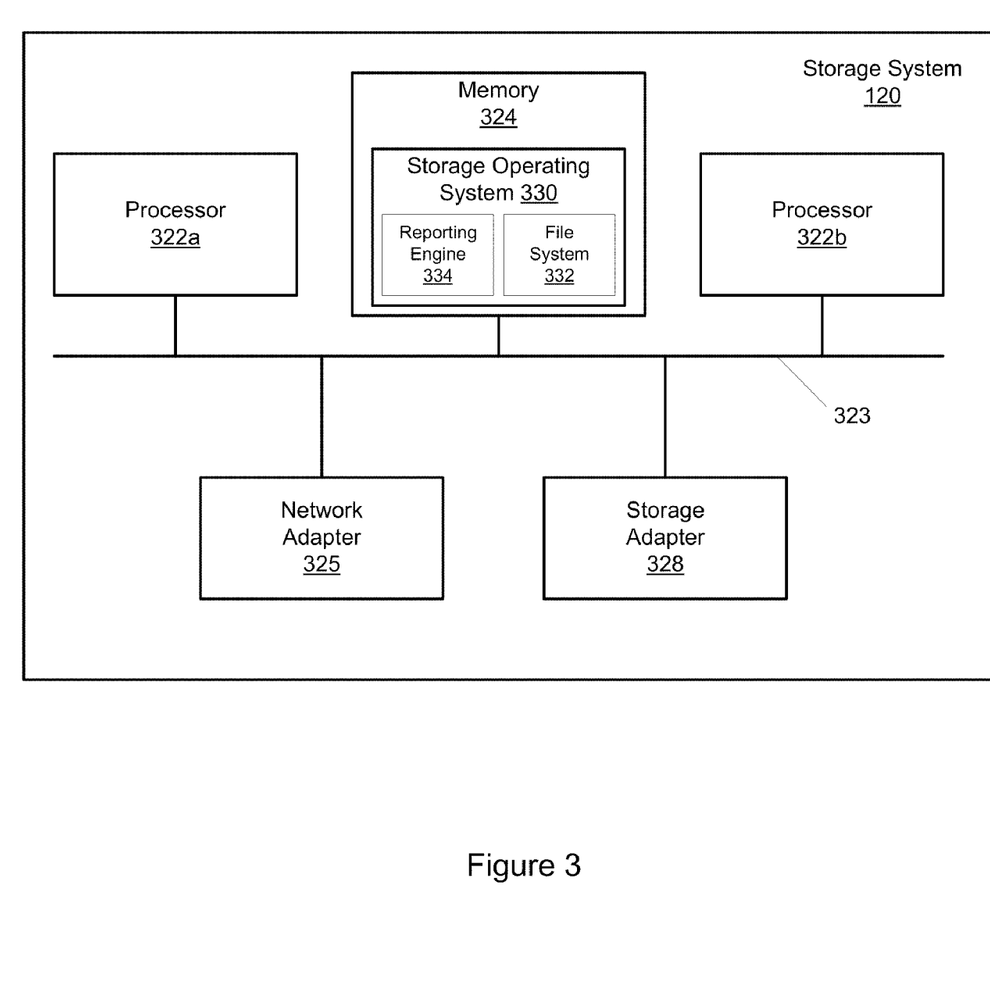
FIG. 3 is a diagram illustrating the architecture of the storage system shown in FIG. 1 according to an embodiment of the invention.

FIG. 3 is a diagram illustrating various components of the storage system 120, in accordance with an embodiment of the invention. Specifically, the storage system comprises a plurality of processors 322a, b, a memory 324, a network adapter 325, and a storage adapter 328 interconnected by a system bus 323. Storage system 120 executes a storage operating system 330 that preferably implements a high-level module, such as a file system, to logically organize the information as a hierarchical structure of named directories, files and special types of files called virtual disks (hereinafter generally "blocks") on the disks.

The memory 324 comprises storage locations that are addressable by the processors and adapters for storing software program code and data structures associated with the present invention. The processor and adapters may, in turn, comprise processing elements and/or logic circuitry configured to execute the software code and manipulate various data structures.

Storage operating system 330, portions of which are typically resident in memory 324 and executed by the processing elements, functionally organizes the storage system 120 by, inter alia, invoking storage operations in support of the storage service implemented by the storage system 120. It will be apparent to those skilled in the art that other processing and memory means, including various computer readable media, may be used for storing and executing program instructions pertaining to the invention described herein. As illustrated herein, storage operating system 330 is preferably the NetApp® Data ONTAP® operating system available from Network Appliance Inc., of Sunnyvale, Calif., that implements a Write Anywhere File Layout (WAFL™) file system. However, it is expressly contemplated that any appropriate storage operating system may be enhanced for use in accordance with the inventive principles described herein to facilitate access to disks. As such, where the term "WAFL" is employed, it should be taken broadly to refer to any storage operating system that is otherwise adaptable to the teachings of this invention. As used herein, the term "storage operating system" generally refers to the computer-executable code operable on a computer that manages data access.

The file system 332 "virtualizes" the storage space provided by the disks. The file system 332 logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored.

Storage operating system 330 further executes a reporting engine 334 configured to periodically monitor utilization of the overwrite reserve space on a volume and to provide the results of the monitoring to monitoring engine 240 at server system 110 via storage system interface engine 270. Mechanism for space monitoring is described in a U.S. patent application Ser. No. 11/366,042, entitled "METHOD AND SYS- TEM OF AUTOMATICALLY MONITORING A STORAGE SERVER," by Peter L. Smoot, et al., the contents of which are incorporated by reference herein in its entirety.

The network adapter 325 comprises a plurality of ports adapted to couple storage system 120 to one or more server systems 110 over point-to-point links, wide area networks, virtual private networks implemented over a public network (Internet) or a shared local area network. The network adapter 325 thus may comprise the mechanical, electrical and signaling circuitry.

The storage adapter 328 cooperates with the storage operating system 300 to access information requested by server system 110. The storage adapter 328 comprises a plurality of ports having input/output (I/O) interface circuitry that couples to the disks over an I/O interconnect arrangement, such as a conventional high-performance, FC link topology.

Figure 4:
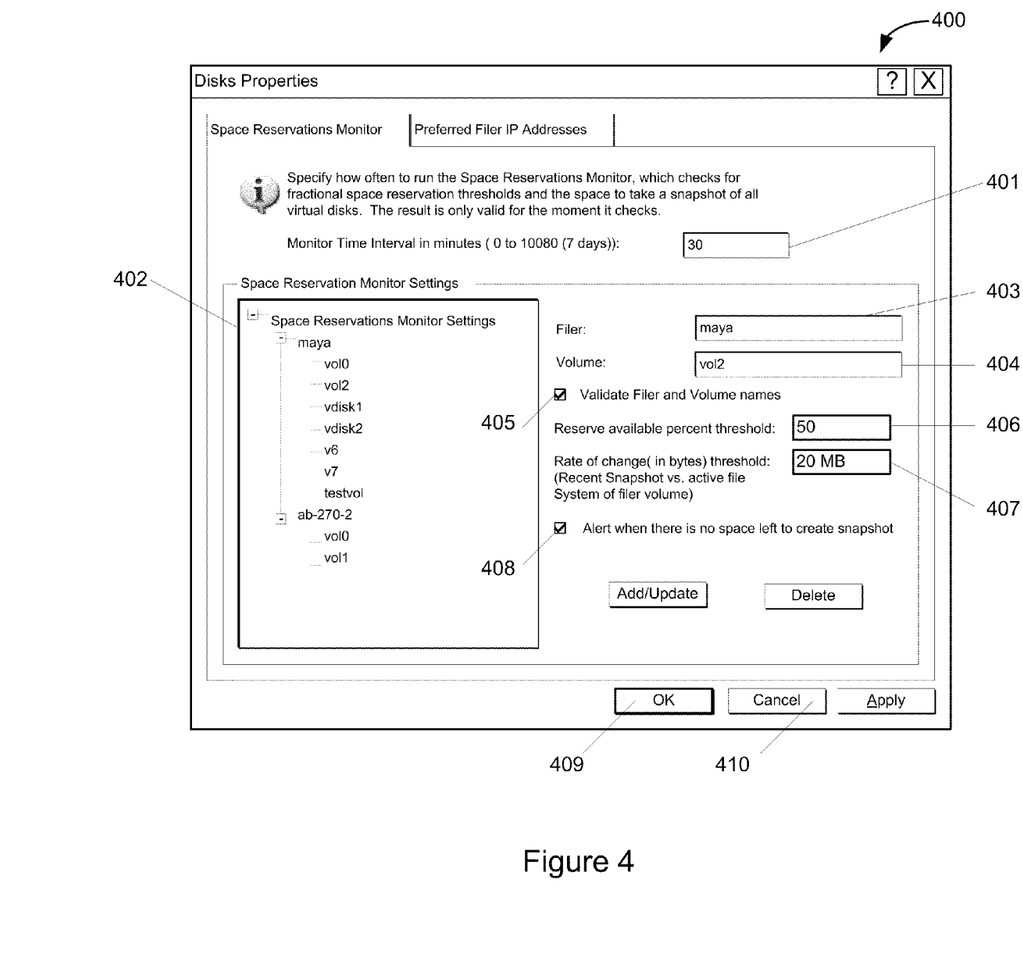
FIG. 4 is a diagram of an exemplary screen presented to a system administrator that allows a user to provide various settings according to an embodiment of the invention.
Figure 5A:
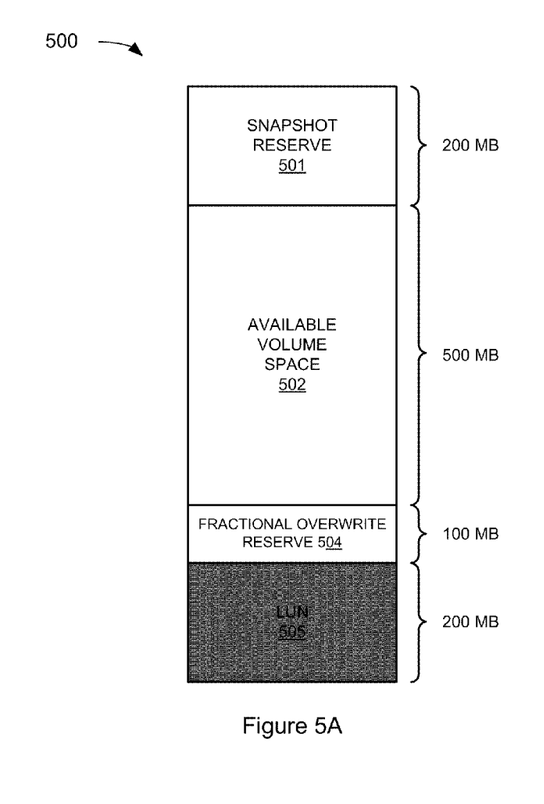
FIGS. 5A and 5B illustrate an example of reserve space allocation and use according to an embodiment of the invention.
Figure 5B:
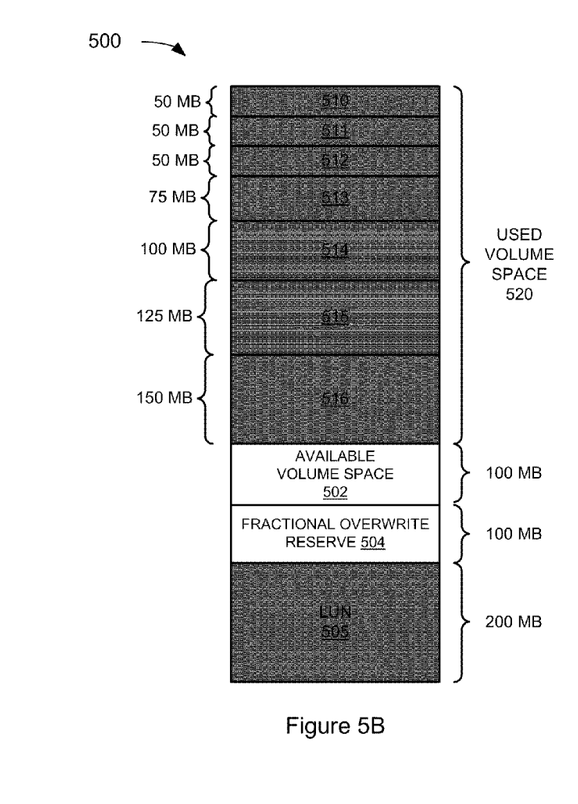

FIG. 4 is an exemplary interface 400 provided by user interface engine 190 to a user of server system 110 that allows a system administrator at console 210 to enter various settings used by SR policy engine 250 to execute space reservation policies. The user interface 400 includes a selection window 401 which allows a system administrator to specify how often the space reservation monitor runs (e.g., every 30 minutes in the example of FIG. 4).

User interface 400 also provides a selection window 402 which allows the system administrator to select individual storage systems (referred to as "filer" in FIG. 4) and volumes in which to apply customized SR policies. The selected filer and volume are displayed in windows 403 and 404, respectively. A checkbox 405 is provided to allow the system administrator to specify that the selected filer and volume names are to be validated (e.g., mounted and accessible).

Interface 400 also includes a window 406 which allows the system administrator to specify a threshold percentage of available overwrite reserve space. A system event will be triggered by SR policy engine 250 if the available (unused) overwrite reserve, as a percentage of the allocated overwrite reserve falls below the threshold percentage. Overwrite reserve can be 100% overwrite reserve or fractional overwrite reserve). For example, in FIG. 4, the system administrator at console 210 indicates that the threshold for overwrite reserve availability is 50%. In operation, SR policy engine 250 receives, from reporting engine 334 at storage system 120, information regarding available overwrite reserve space. SR policy engine 250 uses this information to determine whether the available overwrite reserve space is less than or equal to the threshold for overwrite reserve space availability. In addition, SR policy engine 250 reads snapinfo files from disk(s) 194, which include information about each backup dataset. SR policy engine 250 may use this information to determine which backup datasets to delete according to various business rules as previously described.

Interface 400 also includes a selection window 407, which allows the system administrator to specify a threshold based on the rate of change of a snapshot size (snap-delta). As described herein, the snap-delta may be determined by comparing two snapshots or by comparing an existing snapshot to the changes in the active file system which will be capture in a succeeding snapshot. If the value of the snap-delta function equals or exceeds the specified threshold, then an event will be triggered by SR policy engine 250. For example, in FIG. 4, the system administrator at console 210 indicates that the snap-delta threshold is 10 MB (megabytes). The system administrator may also indicate in checkbox 408 if an alert is to be generated when there is insufficient space available to create a snapshot.

At any time, a system administrator has an option to confirm the settings by pressing "OK" button 409. As a result, SR policy engine 250 accepts the settings. Alternatively, a system administrator can cancel the settings by pressing "Cancel" button 410. GUI engine 290 passes the settings to SR policy engine 250, which, in turn, uses the settings to execute the space reservation policies. A system administrator can change the settings at any time.

FIG. 5A illustrates a volume 500 in one embodiment, having 1000 MB with a 200 MB LUN 505, where the fractional overwrite reserve 504 has been set to 50% of the LUN space. In other embodiments, the percentage may be set at any percentage between 0% and 100%. The volume also includes an initial snapshot reserve 501 of 200 MB, available volume space 502 of 500 MB, and 100 MB of fractional overwrite reserve 504. The size of the volume 500 and its subdivisions used here are for purposes of illustration and ease of discussion. It will be appreciated that in some embodiments, volumes and their subdivisions may be configured with capacities of different orders of magnitude (e.g., gigabytes, terabytes).

FIG. 5B illustrates how snapshots might accumulate in volume 500 over time, in one possible scenario, indicated by the snapshots 510 through 516. In the scenario of FIG. 5B, the snapshots 510 through 516 exhibit a trend of increasing size. In the example shown, snapshots 510-512 are each 50 MB, indicating that the rate of change in the active file system is constant. Starting with the snapshot 513, however, the snapshots begin to grow in size as a result of an increase in the rate of active file system changes. In the example shown, snapshot 513 is 75 MB, snapshot 514 is 100 MB, snapshot 515 is 125 MB and snapshot 516 is 150 MB. That is, the snap-delta between snapshot 512 and snapshot 513 is 25 MB, the snap-delta between snapshot 513 and snapshot 514 is 25 MB, the snap-delta between snapshot 514 and snapshot 515 is 25 MB and the snap-delta between snapshot 515 and snapshot 515 is 25 MB. If the snap-delta threshold had been set at 20 MB as in the example of FIG. 4, then each of these snap-delta functions will trigger a system event.

In one embodiment, the monitoring engine 240 monitors storage system 120 via storage system virtual interface 270 as described herein to detect snap-deltas exceeding a predetermined threshold and executes the policies established via SR policy engine 250. For example, monitoring engine 240 may log the event to event log 228, alert the system administrator (e.g., via audible or visual alarms at the administrator's console 210 and/or email notifications using an email server such as Microsoft™ Exchange Server running as a host application 260).

Figure 6:
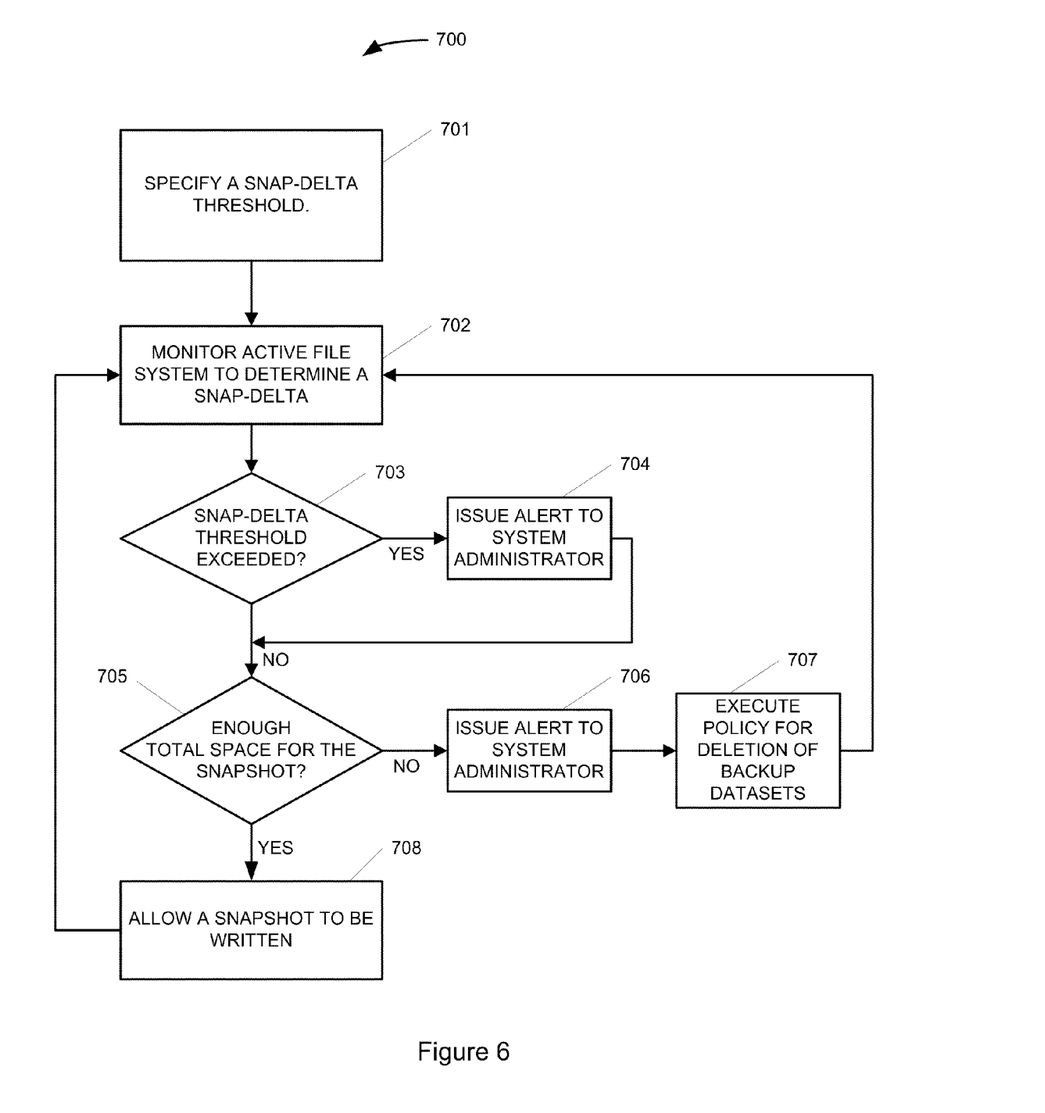
FIG. 6 is a flowchart illustrating another method of space reservation monitoring in a fractionally reserved storage system according to an embodiment of the invention.

FIG. 6 is a flowchart illustrating a method 700 in one embodiment of the invention. In FIG. 6, the method begins with the specification of a snap-delta threshold (operation 701). In operation 702, the active file system is monitored to determine a snap-delta. In operation 703, the snap-delta is compared to the snap-delta threshold. If the snap-delta equals or exceeds the snap-delta threshold at operation 703, an alert is issued, as described herein in operation 704, and the method continues at operation 705. If the snap-delta is less than the snap-delta threshold at operation 703, then the method continues at operation 705. At operation 705, the space required for the next snapshot is compared with the total available space in the volume (including both the unused volume reserve space and the fractional overwrite reserve) to write the snapshot. If there is not enough space for snapshot creation, then an alert is issued at operation 706. Additionally, policies for the deletion of backup datasets may be executed, as described herein, in operation 707. In one implementation, to delete backup datasets, SR policy engine 250 sends a command, via engine 270, to storage operating system 330 at storage system 120. Storage operating system 330 receives the command and deletes the backup datasets on a volume running out of space. As a result of the deletion if backup datasets, more space becomes available on the volume.

Once backup datasets have been deleted, the method may then return to operation 702 to monitor the active file system. If there is enough space for the snapshot to be written at operation 705, then the snapshot is written at operation 708 and the method continues at operation 702.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. Moreover, non-dependent acts may be performed in parallel. The embodiments were chosen and described in order to best explain the principles of the invention and its practical applications, to thereby enable others skilled in the art to best utilize the invention and various embodiments with various modifications as are suited to the particular use contemplated.

Moreover, the teachings of this invention can be adapted to a variety of storage system architectures including, but not limited to, a network-attached storage environment and a storage area network. The term "storage system" should therefore be taken broadly to include such arrangements in addition to any subsystems configured to perform a storage function and associated with other equipment or system.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine, such as a general-purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

What is claimed is:

1. A method for monitoring a rate of change on a volume storing application data, comprising:
monitoring, by a storage server system executing a host application, the rate of change of an active file system, wherein the monitoring comprises determining a snap-delta by comparing a size of a snapshot with a size of a subsequent snapshot to determine the rate of change at a current time;
comparing the rate of change of the active file system to a predetermined rate of change threshold;
responsive to the rate of change having reached the predetermined rate of change threshold, issuing an alert to an administrator of the server system;
responsive to the rate of change not having reached the rate of change threshold, comparing a space required to create a next snapshot to an amount of available overwrite reserve space on the volume; and
responsive to the space required to create the next snapshot having not reached the amount of available overwrite reserve space on the volume, writing the next snapshot to the volume.

2. The method of claim 1, further comprising:
monitoring, by the server system executing the host application, the amount of available overwrite reserve space on the volume.

3. The method of claim 2, further comprising:
comparing the amount of available overwrite reserve space on the volume to a predetermined overwrite reserve threshold; and
responsive to the amount of available overwrite reserve space having reached the predetermined overwrite reserve threshold, issuing an alert to the administrator.

4. The method of claim 3, further comprising:
receiving, by the server system, from a system administrator, the predetermined overwrite reserve threshold and the predetermined rate of change threshold.

5. The method of claim 1, further comprising:
responsive to the space required to create the next snapshot having reached the available overwrite reserve space on the volume, causing, by the server system, a deletion of snapshots on the volume.

6. A system for monitoring a rate of change on a volume storing application data, comprising:
a server system executing a host application and a space reservation (SR) policy engine, the SR policy engine configured to:
monitor the rate of change in backup dataset size, wherein the monitoring comprises determining a snap-delta by comparing a size of a first backup dataset with a size of a subsequent backup dataset to determine the rate of change at a current time;
compare the rate of change in backup dataset size to a rate of change threshold;
issue an alert to an administrator of the server system in response to the rate of change in backup dataset size having reached the rate of change threshold;
compare a size of a next backup dataset to an amount of available overwrite reserve space on the volume; and
write the next backup dataset to the volume in response to the size of the next backup dataset not having reached the amount of available overwrite reserve space on the volume; and
a storage system comprising a volume to store application data of the host application.

7. The system of claim 6, wherein the SR policy engine is further configured to:
compare the amount of available overwrite reserve space on the volume to an overwrite reserve threshold; and
issue an alert to the administrator in response to the amount of available overwrite reserve space having reached the overwrite reserve threshold.

8. The system of claim 6, wherein the SR policy engine is further configured to:
monitor a size of a next backup dataset; and send a request to the storage system to delete one or more backup datasets of the application data on the volume in response to the size of the next backup dataset having reached the amount of available overwrite reserve space on the volume.

9. The system of claim 6, wherein the server system comprises a user interface (UI) engine configured to allow a system administrator to enter the rate of change threshold.

10. The system of claim 9, wherein the server system further comprises a backup management engine configured to create one or more backup datasets of the application data by the storage server and to determine the rate of change in backup dataset size.

11. The system of claim 10, wherein the UI engine is further configured to allow the system administrator to enter a policy to delete the one or more backup datasets.

12. A computer readable storage medium including instructions executable by a machine to configure the machine to perform operations, comprising:
  monitoring a rate of change in backup dataset size, by a server system executing a host application, wherein the monitoring comprises determining a snap-delta by comparing a size of a first backup dataset with a size of a subsequent backup dataset to determine the rate of change at a current time;
  comparing the rate of change in backup dataset size to a rate of change threshold;
  responsive to the rate of change in backup dataset size having reached the rate of change threshold, issuing an alert to an administrator of the server system;
  comparing the size of a next backup dataset to an amount of available overwrite reserve space on a volume; and
  responsive to the size of the next backup dataset not having reached the available overwrite reserve space on the volume, writing the next backup dataset to the volume.

13. The computer readable storage medium of claim 12, wherein the operations further comprise:
  comparing the amount of available overwrite reserve space on a volume to an overwrite reserve threshold; and
  responsive to the amount of available overwrite reserve space having reached the overwrite reserve threshold, issuing an alert to the administrator of the server system.

14. The computer readable storage medium of claim 12, wherein the operations further comprise:
  responsive to the size of the next backup dataset having reached the amount available overwrite reserve space on the volume:
  issuing an alert to the administrator of the server system; and
  sending a request, by the server system to a storage system, to delete one or more backup datasets of the application data on the volume.

* * * * *